(12) United States Patent
Richard

(10) Patent No.: US 9,274,232 B2
(45) Date of Patent: Mar. 1, 2016

(54) METHOD AND APPARATUS FOR ESTABLISHING MESHED GPS NETWORK

(75) Inventor: Meyers Richard, Longboat Key, FL (US)

(73) Assignee: GlobalTrak, LLC, Sterling, VA (US)

(*) Notice: Subject to any disclaimer, the term of this patent is extended or adjusted under 35 U.S.C. 154(b) by 772 days.

(21) Appl. No.: 13/290,077

(22) Filed: Nov. 5, 2011

(65) Prior Publication Data

US 2012/0112959 A1 May 10, 2012

Related U.S. Application Data

(60) Provisional application No. 61/411,415, filed on Nov. 8, 2010.

(51) Int. Cl.
G01S 19/51 (2010.01)
G01S 5/00 (2006.01)
G01S 19/48 (2010.01)

(52) U.S. Cl.
CPC .............. *G01S 19/51* (2013.01); *G01S 5/0072* (2013.01); *G01S 19/48* (2013.01)

(58) Field of Classification Search
USPC ............... 342/357.25, 357.31, 450, 458, 464; 455/456.1, 456.2
See application file for complete search history.

(56) References Cited

U.S. PATENT DOCUMENTS

| | | | |
|---|---|---|---|
| 2008/0207357 A1* | 8/2008 | Savarese et al. | 473/407 |
| 2008/0236275 A1* | 10/2008 | Breed et al. | 73/290 V |
| 2010/0039284 A1* | 2/2010 | Hall et al. | 340/825.36 |
| 2013/0048720 A1* | 2/2013 | Lewis | 235/382 |

* cited by examiner

*Primary Examiner* — Dao Phan

(57) ABSTRACT

An apparatus and method for determining real time location of assets by calculating the relative position of a plurality of GPS enabled devices transported together, taking advantage of multiple GPS enable devices being transported together including dual band GPS and averaging location data between US and European GPS data. Additionally, an IMB acts to receive GPS data from multiple devices in a shipment and IMB combines and averages data from both GPS systems to create more liable location determination.

3 Claims, 5 Drawing Sheets

METHOD AND APPARATUS FOR ESTABLISHING MESHED GPS NETWORK

PRIORITY CLAIM

The present invention claims priority to U.S. Provisional Application No. 61/41 1,415, tiled Nov. 08, 2010. No new matter has been added.

BACKGROUND OF THE PRESENT INVENTION

1. Field of the Present Invention

The present invention relates to a method and apparatus to determine asset location by calculating the relative position of a plurality of GPS enabled devices transported together. More particularly, the present invention derives the most accurate GPS position data to create a real time location system to find the exact location of a single box.

2. Description of Related Art

In automotive GPS receivers, metallic features in windshields, such as defrosters or car window tinting films, can act as a Faraday cage, degrading reception inside the car. Manmade electromagnetic interference (EMI) can also disrupt or GPS signals. In one well-documented case it was impossible to receive GPS signals in the entire harbor of Moss Landing, Calif. due to unintentional jamming caused by malfunctioning TV antenna preamplifiers. Intentional jamming is also possible. Generally, stronger signals can interfere with GPS receivers when they are within radio range or line of sight.

In 2002, a detailed description of how to build a short-range GPS L1 C/A jammer was published in the online magazine. The U.S. government believes that such jammers were used occasionally during the 2001 war in Afghanistan, and the U.S. military claims to have destroyed six GPS jammers during the Iraq War, including one that was destroyed with a GPS-guided bomb. A GPS jammer is relatively easy to detect and locate, making it an attractive target for anti-radiation missiles.

Some countries allow GPS repeaters to facilitate the reception of GPS signals indoors and in obscured locations; however, under European Union and U.K. laws, these are prohibited because the signals can interfere with other GPS receivers that receive data from both satellites and the repeater.

Various techniques can address interference. One is to not rely on GPS as a sole source. According to John Ruley, "IFR pilots should have a fallback plan in case of a GPS malfunction" Receiver Autonomous Integrity Monitoring (RAIM) is included in some receivers, to warn if jamming or another problem is detected. The U.S. military has also deployed since 2004 their Selective Availability/Anti-Spoofing Module (SAASM) in the Defense Advanced GPS Receiver (DAGR). DAGR detects jamming and maintains its lock on encrypted GPS signals during interference.

Real time location systems improve how companies locate, track, and manage high value assets. Modern asset management requires tracking the location of containers and cargo. Currently, various types of Real Time Location Systems (RTLS) such as ISO/IEC 24730-2, Cisco, CCX Wi-Fi, precision GPS and Ultra-Wideband are being used to fit the operational needs of the customer.

The present application discloses a method and apparatus designed to increase reliability location data by creating a GPS mesh network device to communicate with existing GPS devices and coordinate data to improve visibility into the exact location and status of assets. This increased visibility will enable the customer to pinpoint the real time location of a single box more accurately and efficiently than the prior art. This level of real time asset management translates into greater operational efficiency and performance, cost reductions, and improved safety and security.

SUMMARY OF THE PRESENT INVENTION

The object of the present invention is to overcome the shortcomings disclosed in the prior art. The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
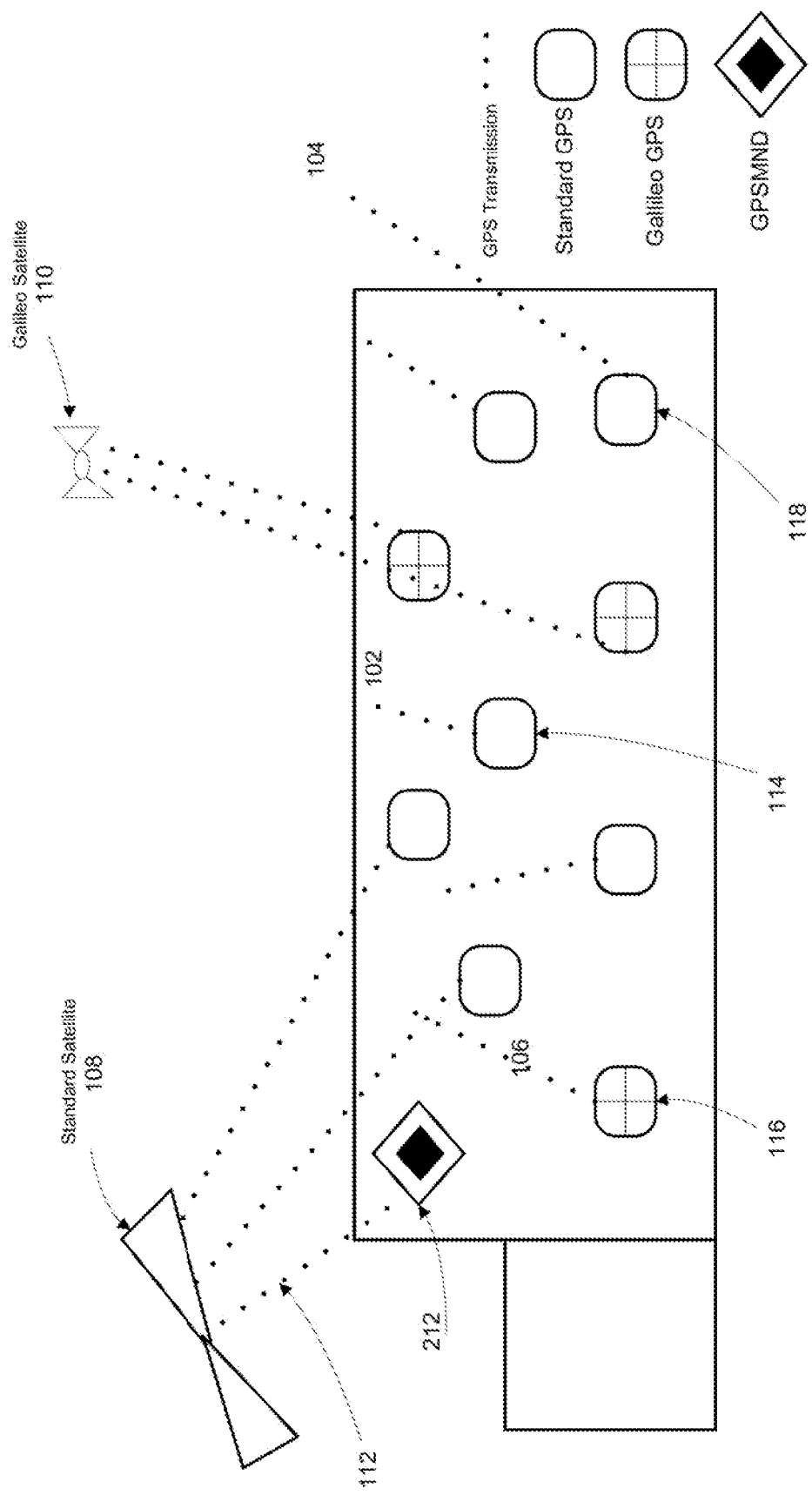
FIG. 1 is an illustrative example of a plurality of different GPS devices within a tractor trailer.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

With reference now to FIG. 1, an illustrative example of a plurality of different GPS devices contained within a tractor trailer will now be discussed. As shown in FIG. 1, a plurality of different models of GPS devices are attempting to transmit various signals. For the purposes of example, the GPS devices shown include six Standard GPS devices and three Galileo GPS devices. As further shown in FIG. 1, a standard Satellite 108 is provided transmitting to the Standard GPS model devices and a Galileo Satellite 110 is provided transmitting specifically to the Galileo GPS devices 116. As further shown in FIG. 1, a GPS-Mesh Network Device 212 is provided transmitting 112 to the Standard Satellite 108.

As shown in FIG. 1, a varying amount of interference is blocking a percentage of the GPS devices within the tractor trailer from successfully transmitting to the satellites. For example, the transmission 106 from a Galileo GPS 116 is not able to penetrate a vertical obstruction. Further, the transmission 102 from a Standard GPS 114 is not strong enough to penetrate the tractor trailer. Additionally, the unsuccessful transmission 104 from another Standard GPS 118 may be caused by atmospheric interference.

Figure 2:
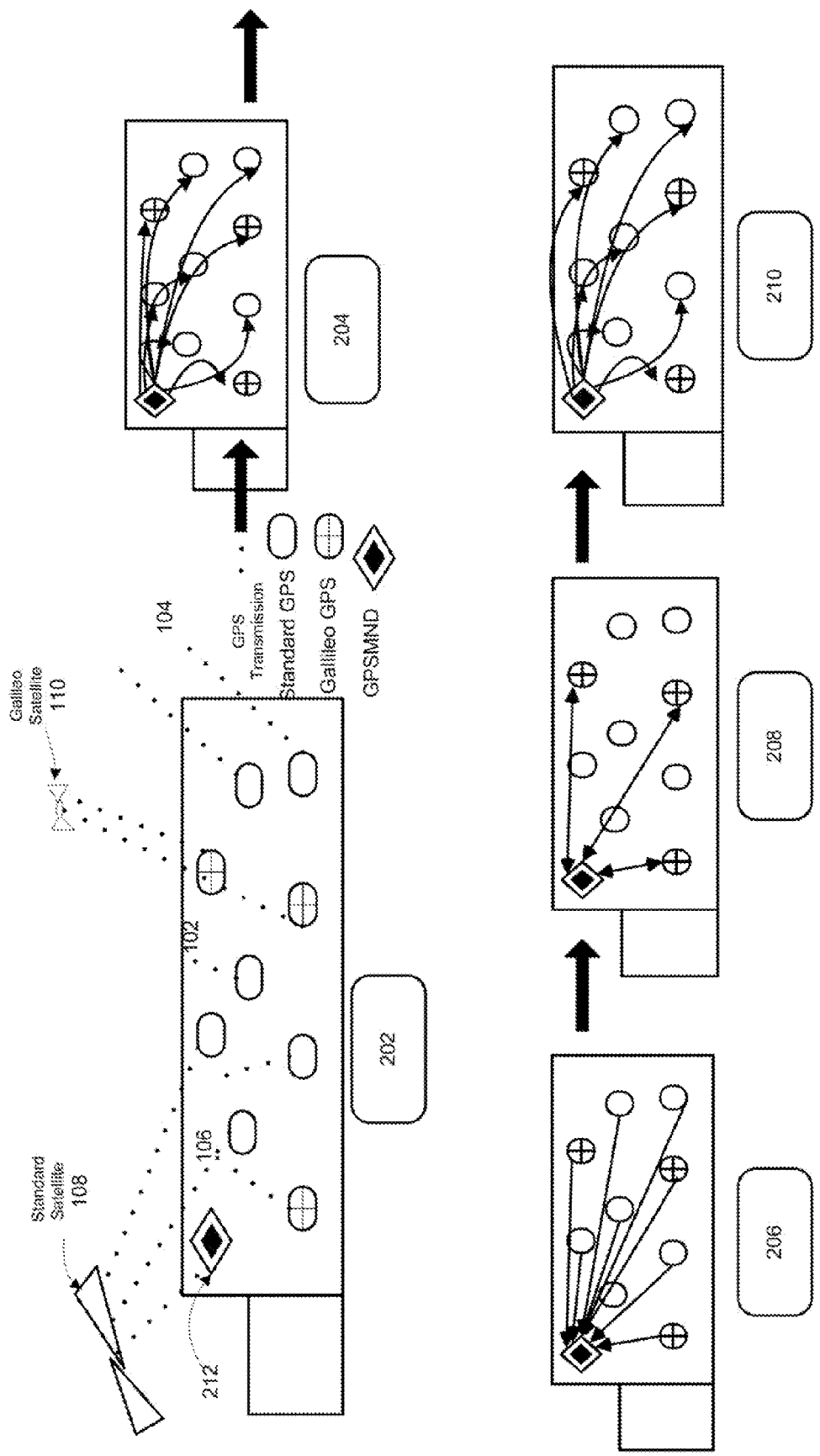
FIG. 2 is a schematic diagram of a GPS mesh network communications system according to an embodiment of the present invention.

With reference now to FIG. 2, a first preferred method of establishing a GPS mesh communications network system will now be discussed. As shown in FIG. 2, an example of a plurality of different GPS devices within a tractor trailer 202 as previously described paragraphs [0023] and [0024] is shown. Within this example, the first step in establishing a GPS Mesh Communications Network 204 is GPS Mesh Network Device 212 successfully transmitting to a satellite to determine location. In the example of FIG. 2, the communications is via the Standard Satellite 108. However, the GPS Mesh Network Device 212 may be alternatively configured to communicate with the Galileo satellite 110 or multiple satellite systems which may be chose based on the quality of reception or other factors.

After the GPS Mesh Network Device 212 has determined its location, it sends out a RF ping in all directions to locate all other GPS receivers within the trailer compartment and requests their location data 206. Once the request for the location data from each GPS device is submitted and received, the GPS Mesh Network Device 212 preferably crosschecks or compares the location data 208. The GPS Mesh Network Device 212, using dual band GPS, will average the location data between the Standard U.S. Satellite 108 and the European Galileo Satellite 110. Finally, the GPS Mesh Network Device 212 will determine the most accurate location data and distribute it back to the other GPS devices in the network 210. The preferred outcome being a robust confidence in accuracy of the location data.

Figure 3:
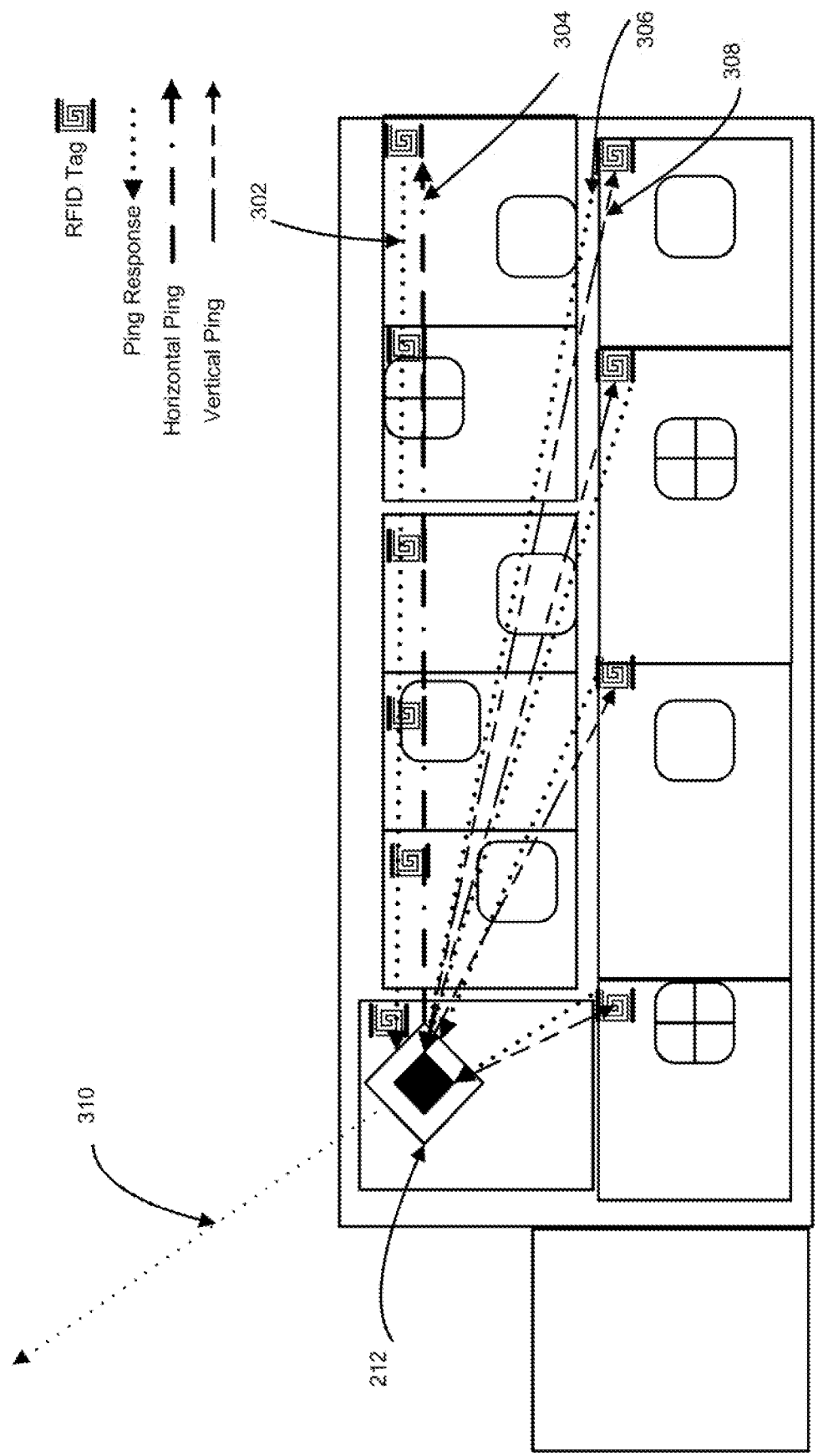
FIG. 3 is an illustrative diagram of a method of determining and mapping the relative distances between monitored elements according to an embodiment of the present invention.

With reference to FIG. 3, an illustrative diagram of a method of determining and mapping the relative distances between monitored elements will now be discussed. For the purposes of this discussion, a monitored element is defined as any item, box, package or container having an embedded or attached RFID tag. Preferably, each RFID will transmit a distinctly identifiable code or number.

Figure 4:
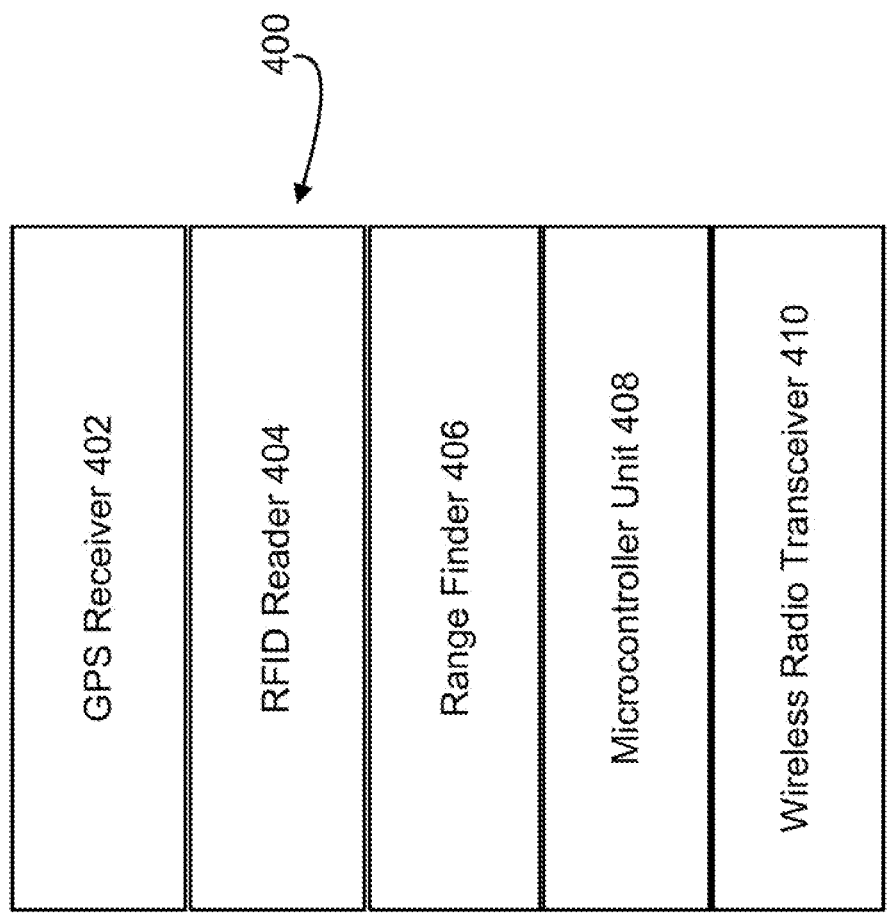
FIG. 4 is a block diagram of a preferred embodiment of the present invention.

As shown in FIG. 3 with reference to elements of the GPS Mesh Network Device as described in FIG. 4, the GPS Mesh Network Device 212 may send out a first ping 304 which may poll RFID devices and detect measurable responses based on distance and time algorithms. A second ping may be transmitted for polling for responses from RFID tags which may be situated on other planes within the container. Based on the time of the returned signals from the various monitored element, the GPS Mesh Network Device may then calculate the relative locations of each monitored element within the storage area. The controller unit 408 may then create a map of the relative real time location of all monitoring elements within the compartment. This data may be transmitted to a home station 310 via satellite uplink for backend analysis. Additionally, this method can be repeated by multiple GSA Mesh Network Devices to increase the reliability of data.

According to an alternative embodiment, the GPS Mesh Network Device 212 may include a range finder 404 which is configured to measure the interior dimensions of a cargo hold. According to further alternative embodiments, the interior dimensions may be determined by other means such as manually measured, acoustically or otherwise. Thereafter, using the determined dimensions of the cargo hold, the GPS Mesh Network Device may send out single ping to the monitored elements. Based on the response time from each monitored unit and the dimensions of the cargo hold, the GPS Mesh Network Device 212 may approximate the relative real time location of each monitored element. Thereafter, the controller unit 408 may create a map of the relative real time location of all monitoring elements within the compartment and transmit the map to a home station 310 via satellite uplink for backend analysis. Further, the relative locations of the monitored elements may be compared with previous measurements to determine whether any shifting or tampering of the contents has occurred.

With reference now to FIG. 4, the details of a block diagram of the present invention will now be discussed. As shown in FIG. 4, a Global Positioning System Mesh Network Device 400 (GPSMND) comprises a GPS receiver 402, an RFID reader 404, a range finder 406, a microcontroller unit 408 and a wireless radio transceiver 410. The GPSMND may be a stand-alone unit inserted or affixed, either temporarily or permanently, into a compartment, such as a ships hold, freight warehouse, or trailer unit. Preferably, the range finder 406 may employ a radio radar finder technology, but alternatively, may employ alternative technologies that produce accurate measurements between the GPS Mesh Network Device 212 and other GPS devices. For example, other forms of range finder technology may include: laser, radar, sonic or ultrasonic technologies.

Processing System

Figure 5:
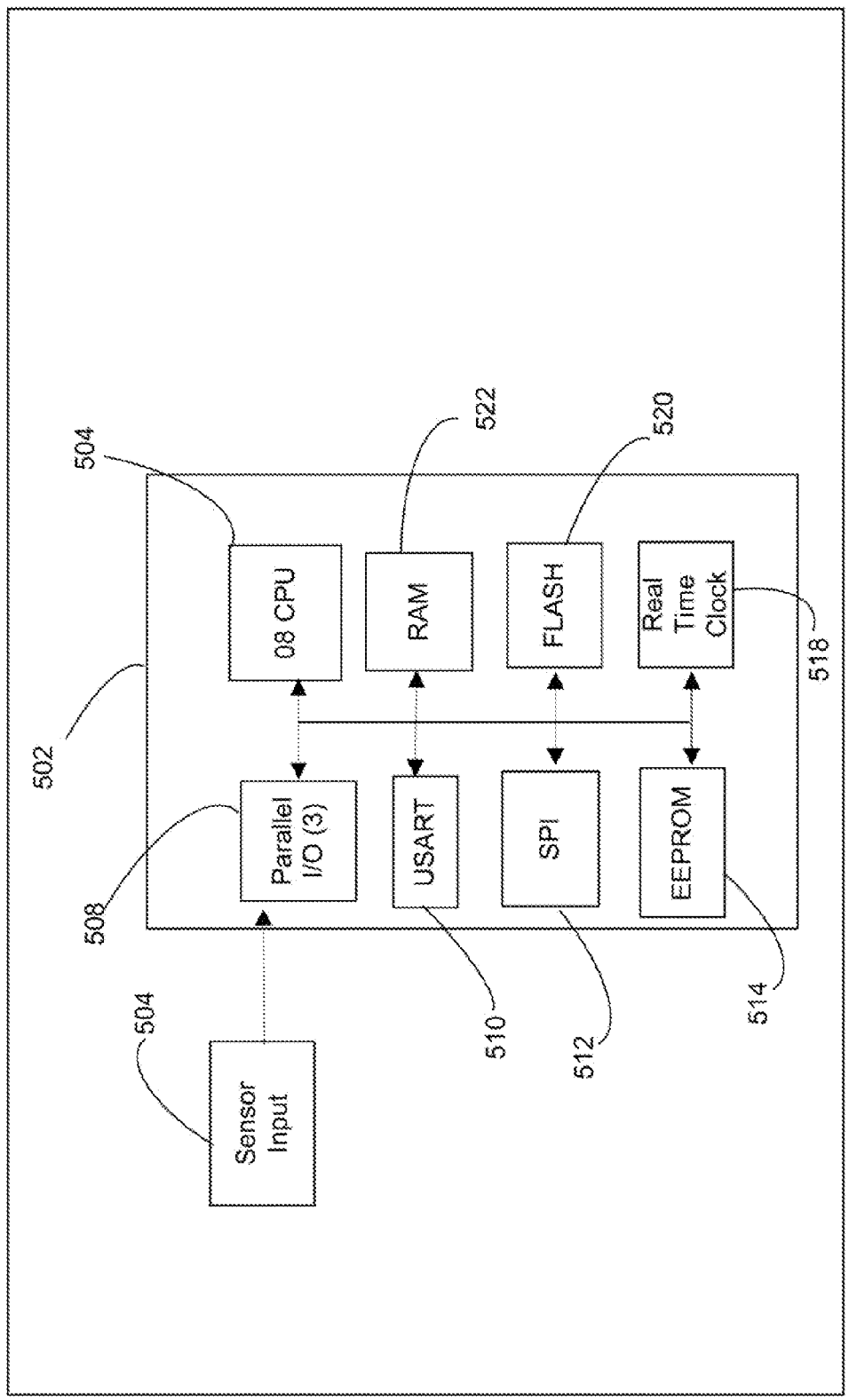
FIG. 5 is a functional configuration of a microcontroller unit according to an embodiment of the present invention.

With reference now to FIG. 5, it is preferred that the microcontroller unit 502 incorporates a microprocessor 504, a real time clock 518, a general purpose Input/Output port to support external peripheral control 508, a Universal Synchronous/Asynchronous Receiver Transmitter (USART) 510, a Serial Port Interface (SPI) 712, and memory such as RAM 722, FLASH memory 520, and EEPROM 514 as shown.

Preferably, the microprocessor 504 used may be a low power, high performance, eight-bit intergrated circuit based on the Motorola HCS08 instruction set. Such a chip, for instance the NCL08 microcontroller, will preferably use an event driven power management technique to reduce power consumption by half compared with alternative microprocessors. The controller will preferably manage power and host the master date-time clock, communication scheduling and annotation of flash memory records.

Communication System

In accordance with a preferred embodiment of the present invention, the reporting may be made via a wireless connection to a satellite mode to communicate with a satellite system such as Globalstar or Orbcomm. Preferably, such a satellite device will be a device such as the Axxon, AutoTracker, or a customized Orbcomm VHF satellite GPS tracking communications device which may be adapted with Zigbee interface antenna devices to incorporate them into the overall LAN architecture of the security system. These devices include a satellite transceiver, a GPS receiver, a customized Zigbee wireless antenna with a serial (Ax Tracker) or duplex (OrbComm) interface.

In accordance with an alternative preferred embodiment of the present invention, the reporting may also be made using a wireless system independent from the satellite system. According to this embodiment, wireless signals may be transmitted to a wireless relay, base station or the like for routing and transmission to a chosen centralized location independent from or in combination with the transmissions made from the satellite system. In accordance with this alternative embodiment, signals may also be received by the communications manager and wireless interface from such external wireless networks as well.

According to a preferred embodiment of the present invention, it is preferred that the wireless communications used within the present invention will be based on the Zigbee (IEEE 802.15.4) standard. This standard transmits RF signals in the 2.4 GHz ISM band and operates with low power consumption due to its relatively slower data transmission rate (128 Kpps-250 Kbps). This approach enables additional capacity and flexibility of design through an up to 255 node pico-network. Communications are simplex or duplex in design, meaning that data can be assessed in either a push or pull process.

As referred to above, all communications of the present invention may be designed to be duplex or simplex in nature. Further, as needs require, the processes for transmitting data to and from the present invention may be designed to be push or pull in nature. Still, further, each feature of the present invention may be made to be remotely activated and accessed from distant monitoring stations. Accordingly, data may preferably be uploaded to and downloaded from present invention as needed. For example, as detailed above, each system and subsystem of the present invention may be designed to send, receive, report and request information via the wireless and/or satellite systems so as to continually maintain and update the container systems.

Additional communications with the communications manager are preferably enabled via industry standard wired interfaces, with communications protocols implemented in firmware for future upgrade. These interfaces preferably will include at least two RS-322 compatible serial ports. These alternate serial ports may assist the communications manager to interface with additional remote sensors as well as other local reader/controllers such as an RFID reader or other devices.

Remote Monitoring

To support and monitor the dataflow generated by the present invention, it is preferred that users establish a centralized location to collect and analyze data. This central location or "data fusion center" would preferably consolidate all tracking signals, sensor alarms and reports generated by the monitoring systems and provide further context and links with current intelligence.

Preferably, such a data fusion center will receive such source information in a variety of formats such as Electronic Data Interchange, XML, E-mail, HTML and flat text files. After receiving such data, the data fusion center preferably would act to process information to identify anomalies. With this data collected and processed, analyst may calculate statistics and probability of detection models used for decision support.

In terms of decision making, such a data fusion center would assist agents and shippers in making decisions regarding the status of each container. In short, such a data fusion center would preferably provide a consolidated source of information that could be used to assist agencies and shippers to identify containers quickly and accurately.

What is claimed is:

1. A method for determining the relative location of monitored elements within a closed container, the comprising:
   determining the dimensions of the closed container;
   querying a plurality of monitored elements:
   collecting responses from one or more monitored elements; and
   determining the relative location of a monitored element based on a response time for the monitored element.

2. The method of claim 1, wherein the method further comprises mapping the location of each asset based on the time of response to the query.

3. The method of claim 2, wherein the method further comprises transmitting location data for at least one monitored element to a remote location.

* * * * *